United States Patent Office 3,814,670
Patented June 4, 1974

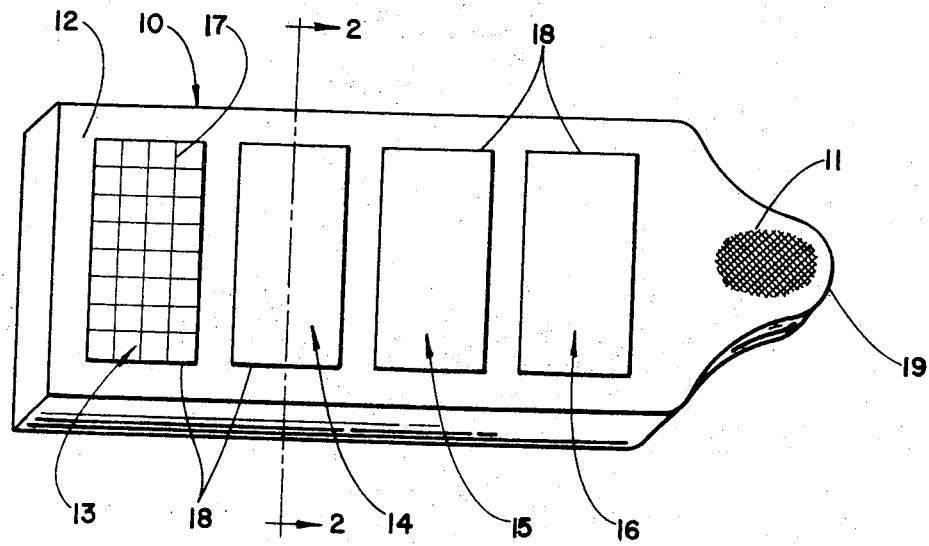
FIG. I
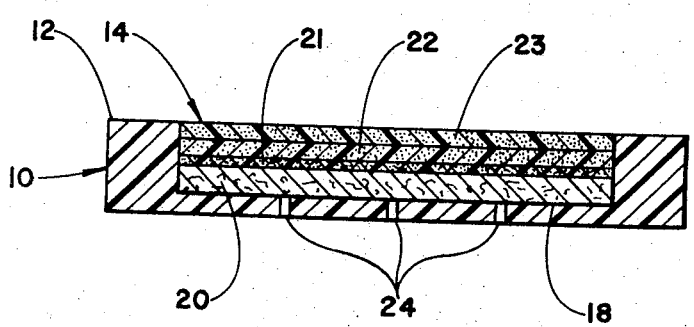
FIG. 2

3,814,670
TEST ARTICLE FOR USE IN MICROBIOLOGY
Ronald Freake and Billy Harper Haden, Elkhart, Ind., assignors to Miles Laboratories, Inc., Elkhart, Ind.
Filed Apr. 26, 1972, Ser. No. 247,868
Int. Cl. C12b 1/00
U.S. Cl. 195—127   29 Claims

ABSTRACT OF THE DISCLOSURE

Test article for use in culturing, detecting and analyzing microorganisms comprising an absorbent web and a substantially dry, stable, continuous layer of a gel such as agar or gelatin, joined in laminar relationship therewith by a continuous interface integral with said web and gel layer and comprising a composite of the web and gel layer. Said device may be additionally comprised of one or more substantially dry, stable, continuous overlayers of a gel positioned in laminar relationship with the initial gel layer. Such gel overlayer is preferably incorporated with a reagent which includes microbiological nutrient media, background dyes and color indicators.

BACKGROUND OF THE INVENTION

The detection and analysis of microorganisms such as bacteria, fungi, and yeast which cause disease in man and animals, are of primary importance to those engaged in the control of such disease. The simplicity of detection as well as the reliability and stability of the detection device greatly affect the efficiency and ultimate success in curing and controlling disease. Many techniques have evolved in the area of microbiology for the detection of microorganisms since the discovery that such microorganisms are a cause of many diseased conditions in man and animals. A test article for use in this capacity would optimally be simple to use, reliable, stable with respect to time and environment, structurally compact for ease of storage and transportation, and inexpensive. Its use would obviate the present confinement of microorganism detection to the sterile laboratory. Such a test article also would not be limited in scope to the diagnosis of disease, but would be functional in any industrial or medical area requiring the simple and reliable detection of microorganisms.

DESCRIPTION OF THE PRIOR ART

Methods and devices in common usage today for the detection and analysis of microorganisms employ assays of the various substances and areas of the body that support microorganisms such as blood, urine, saliva and skin. In order to determine the presence or absence of disease-causing microorganisms and the extent of infection, if any, these assays generally utilize culturing techniques designed to provide qualitative and quantitative results. Normally these culturing techniques entail the inoculation of an appropriate microbiological growth medium, the incubation of the system under standardized conditions, and the observation and analysis of the microorganism growth colonies.

The usual culturing technique employs agar gel or related gels in petri dishes as an environment for systematic inoculation, incubation and analysis. Agar gel is especially suited as a culturing environment due to its peculiar physical properties. However, the preparation and use of the agar gel dish techniques are time consuming and the stability of the system with respect to time is limited due to deterioration of the medium. Moreover, under some conditions of storage, contamination poses a major problem. The result of such limitations is the confinement of these techniques to test situations in a laboratory. Desirable improvements upon the agar gel dish technique are much needed in order to better facilitate the detection and analysis of microorganisms in the diagnosis of disease.

Methods utilizing bibulous pads, such as paper, impregnated with microorganism nutrient media have recently been devised. Such pads are dried after the impregnation of nutrients, thereby improving upon the stability of the agar gel dish techniques. The sequence of procedural steps for detecting microorganisms by the use of such devices usually involves inoculation through the action of dipping the pad into the broth to be tested, incubation under standardized conditions, and observation of resultant microorganism colonies; hence, such systems are often called "dip-incubate-read" devices. Semi-quantitative results might be possible through the additional incorporation of color indicators; however, since the colonies grow throughout the pad and not on the surface, morphology studies are usually restricted. Removal of pure colonies for further analysis and classification likewise is severely limited.

Further evolution of the "dip-incubate-read" type device has resulted in the contacting of a semi-permeable membrane to the surface of the impregnated bibulous pad. Inoculation by the alternative method of "streaking" is available for use with these devices to give qualitative results and allows the study of the morphology of the microorganism growth colonies. Semi-quantitative results are possible utilizing the standard "dip-incubate-read" system of operation. The resulting growth of microorganism colonies on the surface of the semi-permeable membrane is retarded, however, where the method of contacting the membrane to the pad has failed to provide sufficient interaction between the two structures for the conduction of nutrients to the incubating microorganisms. Also, subjective quick diagnosis through morphological observation of pure colonies is affected by the variations of microorganism growth as observed on the surface of the membrane compared to the growth as observed in the classical agar gel dish techniques. The ability to quickly and effectively classify the microorganisms undergoing pure culture growth as well as to quantitatively evaluate the extent of infection is therefore limited.

SUMMARY OF THE INVENTION

The instant invention discloses a test article for use in microbiology comprising an absorbent web and a substantially dry, continuous layer of a gel joined in laminar relationship therewith by a continuous interface between the web and gel layer that is a composite of the web and gel layer. The test article of the present invention may further comprise one or more substantially dry, continuous overlayers of a gel positioned in laminar relationship to the initial gel layer. The absorbent web and/or the gel overlayer or overlayers are preferably incorporated with a reagent or reagents. Preferred reagents include microbiological nutrient media, suspending agents, background dyes and color indicators. This invention also provides a test article for use in microbiology for the culturing, detection and analysis of microorganisms which provides a gel surface for microbiological growth that is reliable, stable with respect to time and surroundings, simple and compact for easy storage and transportation, inexpensive, and which allows removal of microorganism colonies for further analysis. In addition, utilizing agar as the gel comprising the overlayer or overlayers, morphology studies of resultant microorganism growth are provided with an agar environment comparable to that present in commonly used agar gel dish techniques. The disclosed structure is preferably attached to or otherwise associated with a support or holder and provided with a sealable container to form an integral test device.

DESCRIPTION OF THE DRAWINGS

FIG. 1 is a perspective plan view of a test article utilizing the laminated structures of the instant invention;

FIG. 2 is a cross-sectional view of the device in FIG. 1 taken along the line 2—2.

DESCRIPTION OF THE PREFERRED EMBODIMENTS

Figure 3:
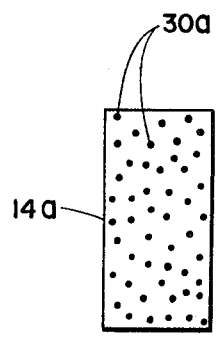
FIGS. 3, 4 and 5 are plan views of test articles of the instant invention showing microorganism growth patterns.

The instant invention provides an integral test article for use in culturing, detecting and analyzing microorganisms and which possesses several individual features of improvement over the prior art devices. In the first place, the instant invention is operationally simple and inexpensive compared to the time consuming and spatially limiting present agar gel techniques. Secondly, it is structurally compact for ease of storage and transportation, unlike the present cumbersome agar gel techniques. Thirdly, it is stable with respect to time and surroundings as a result of its dehydrated state which thereby extends the useful life of the gel surface and which prohibits microorganism growth through contamination. Fourthly, it is reliable in comparison to pads which are contacted with membranes in that the continuous interface structure provides a more effective contact between the individual structural members. This causes the reagents to distribute themselves uniformly, thereby allowing the growth and detection of microorganisms to be independent of the structural deficiencies found in contacting membranes to pads. Fifthly, it allows the removal of microorganism colonies for further analysis which cannot be accomplished using conventional impregnated pads. Sixthly, it provides a means of detecting microorganisms with a minimum lag-phase effect from changes in environment by allowing rehydration to be accomplished in the liquid media containing the microorganisms. And lastly, by using agar as the gel comprising the overlayer, it provides an agar surface for microorganism growth consistent with the classical agar gel surfaces in petri dishes with which microbiologists are well acquainted. This feature permits quick diagnosis through morphological observation of the microorganism growth.

With reference now to the drawings, FIG. 1 shows a multiple test device 10 comprising an elongated generally rectangular base member 12 having a series of molded rectangular wells 18. The base member 12 may be molded of plastic and may have a projection 19 having a roughened surface portion 11 acting as a handle capable of being held by means of fingers. The wells 18 are respectively fitted with laminated structures 13, 14, 15 and 16 which are impregnated with the same or different reagents. The laminated structures may be provided with grid lines 17 to facilitate counting of colonies as illustrated in laminated structure 13. For the purposes of this invention, the term reagent includes chemicals and biological substances such as microbiological nutrient media.

In FIG. 2, the laminated structure 14 is shown as comprising an absorbent web 20, such as paper, and a layer 22 of a gel forming a web-gel layer interface 21 integral with the web and gel layer and comprised of a composite of the web 20 and gel layer 22. This laminar structure may additionally comprise an overlayer 23 of a gel. The gel layers 22 and 23 and the interface 21 are continuous and substantially dry. Vents 24 are provided in base member 12 to allow liquid to be absorbed into the web 20 therethrough.

Figure 6:
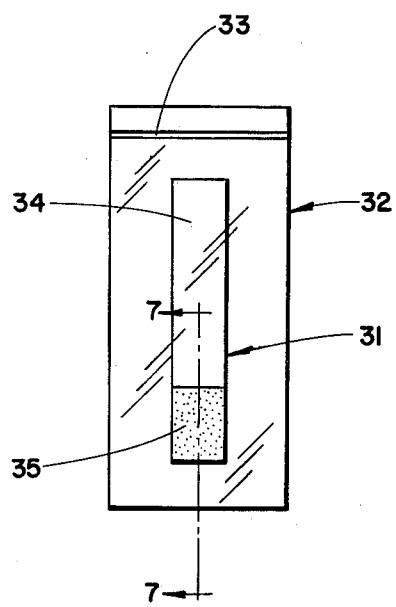
FIG. 6 is a plan view of another test article of the instant invention enclosed within a sealable container.
Figure 7:
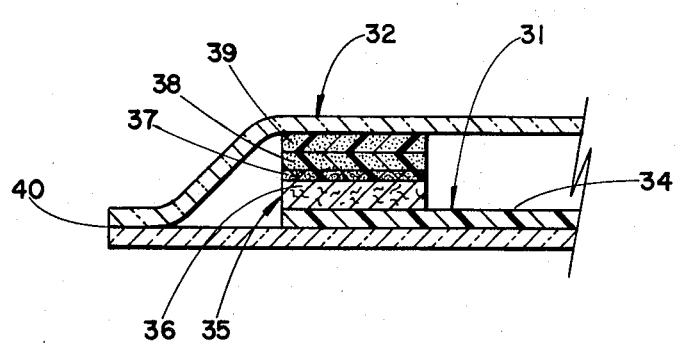
FIG. 7 is an enlarged fragmentary sectional view taken along line 7—7 in FIG. 6.

FIGS. 6 and 7 show a test device 31 consisting of an elongated strip of plastic 34 as a handle and a laminar structure 35 impregnated with a reagent or reagents and affixed to one end of the handle. This device is enclosed within a sealed transparent plastic envelope 32 having an interlocking seal lip 33.

In FIG. 7, the laminar structure 35 is shown comprising an absorbent web 36, such as paper, and a layer 38 of a gel forming a web-gel layer interface 37 integral with the web 36 and gel layer 38 and comprised of a composite of the web 36 and gel layer 38. This laminar structure 31 may additionally be comprised of an overlayer 39 of a gel. The gel layers 38 and 39 and the interface 37 are continuous and substantially dry. The edges of the envelope 32 are heat sealed as at 40.

Both of the two basic illustrated devices 10 and 31 are comprised of similar laminated structures, 13 through 16 and 35 respectively. With the incidental exceptions of size and means of affixing the laminated structures to the base member, the structures may be considered together in the following discussion of their characteristics and functions. Both comprise an absorbent web, a gel layer, and a web-gel interface, and may additionally comprise one or more gel overlayers.

The absorbent web may consist of bibulous paper, cloth, wood or any other suitable substance capable of absorption and retention of liquid. The dimensions of the web are a matter of choice and the web may assume a variety of shapes such as planes, cylinders, and so forth. The web is preferably impregnated with microbiological nutrients and suspending agents and may also be impregnated with color indicators or background dyes as desired.

At this point it is important to understand the use of the terms "layer" and "overlayer" in the context of this disclosure. The instant invention discloses a test article comprising an absorbent web and a "layer" of a gel in laminar relationship as further described herein. The test article also may comprise an additional "layer" or "layers" referred to as an "overlayer" or "overlayers" which are in laminar relationship as further described herein. The "overlayer," if present, is merely the "layer" or "layers" superimposed on the initial "layer." The distinction is based upon the differential composition of the two or more layers rather than upon standards of thickness or of process of preparation.

As a further illustration, there are three general categories which encompass the possible composition differentiations which result in the formation of two or more distinct "layers" as the term is used herein. They are (1) the sequential deposition of two or more different gel mixtures, (2) the sequential deposition of two or more gel mixtures consisting of the same gel and different reagents or different concentrations of reagents, and (3) the sequential deposition of two or more gel mixtures consisting of different gels and different reagents or different concentrations of reagents. Further illustration may be found in the example to follow.

The initial layer, or only layer if there is no overlayer, of gel in laminar relationship with the absorbent web is continuous and substantially dry with a preferred range of dehydration of about 68 to 99%. In the absence of a gel overlayer, this layer functions as and has the characteristics of an overlayer as later described. When used in conjunction with a gel overlayer as is preferred, this layer functions to seal the surface of the absorbent web forming a web-gel layer interface and a new surface that is "pinhole free." Such "pinhole free" surface is impervious to microorganisms and organic dyes in non-aqueous solvents but is permeable to microbiological nutrients and moisture. It has been found that within the operable thicknesses disclosed herein such permeability is primarily dependent upon the concentration of the gel rather than upon thickness. A concentration range of gel which produces the desired permeability of this gel layer to moisture and microbiological nutrients has been found to be about from 1.5 to 20% by weight in the rehydrated state, and preferably about from 3 to 15% by weight, such concentrations depending upon the particular gel used. A functional thickness range has been found to be about from 0.05 to 1.0 mm. in the rehydrated state with a preferable thickness about from 0.1 to 0.5 mm., again depending upon the specific gel used.

For the purposes of this disclosure, the term "gel" includes homogeneous or heterogeneous solid phases of colloidal solutions. Such gels which may be utilized include gelatin, agar, mixtures of gelatin and agar, and mixtures of gelatin and/or agar with such colloidal substances as cellulose gums, alginates, albumins, carrageens and complex polysaccharides and polypeptides. Other gels and mixtures of gelatinous and colloidal substances which are lyophilic and which are capable of forming a "pinhole free" surface may also be employed. The gel layer may also be incorporated with a reagent or reagents including microbiological nutrients, color indicators, or background dyes as desired.

The web-gel layer interface by its nature adopts the characteristics of both the web and gel layer. Impregnants found in the web and/or the gel layer are therefore also found in the interface. This interface serves to facilitate interaction between the absorbent web and the gel layer with respect to the incorporated reagents as well as with respect to the inoculating or sterile fluid introduced at the time of use. This continuous interface promotes liquid and nutrient diffusion and serves as a layer of transition between the web and gel layer such that the useful features of both the web and the gel layer with respect to microorganism growth are thereby united to form an even more useful structure.

The gel overlayer which is preferably added is in laminar relationship to the initial gel layer, continuous and substantially dry with a preferred range of dehydration from about 68 to 99%. The surface of this gel overlayer serves as a support for microorganism growth. In this function, it has been found that a useful concentration range of gel is about from 1.5 to 20% by weight depending upon the gel used. A functional range of thickness of this overlayer has been found to be about from 0.05 to 1.0 mm. in the dehydrated state with a preferred range of about from 0.1 to 0.5 mm. depending upon the gel used. A desirable thickness affords sufficient volume to effectively retain and diffuse incorporated reagents in order to support microorganism growth while allowing efficient and substantial rehydration to be attained.

One or more overlayers may be utilized and such gels which may be employed include gelatin, agar, mixtures of gelatin and agar, and mixtures of gelatin and/or agar with such colloidal substances as cellulose gums, alginates, albumins, carrageens and complex polysaccharides and polypeptides. Other gels and mixtures of gelatinous and colloidal substances which are lyophilic and which are capable of supporting surface microorganism growth and diffusing impregnated reagents may also be employed. Agar is particularly useful since it is presently in common usage as a microorganism support medium. The gel overlay is preferably incorporated with a reagent or reagents including microbiological nutrients, color indicators and background dyes as desired.

As indicated above, a preferred embodiment comprises the impregnation of the structure in its entirety or in one or more of gel layers with a microbiological nutrient media which may include various compositions of such nutrients as Actinomyces broth, beef lactose, brain heart infusion, azide dextrose, Christensen's formulation, Eosin methylene blue, formate, Ricinoleate broth, tryptose blood agar, M-yeast broth, Sabouraud liquid broth modified, and so forth, and variations thereof. By choosing a nutrient medium and inhibitor mixture which is specific to a single microorganism, it is possible to detect the presence or absence of a particular microorganism through a growth or no growth observation.

Color indicators and background dyes may also be incorporated as previously described. Such color indicators and background dyes are distinguishable categories for the purposes of this disclosure. The term color indicator refers to a dye capable of providing a color change in response to the presence of microorganism growth. As such it may be a simple pH indicator such as phenol red which changes from yellow orange to bright pink in the presence of a microorganism capable of decomposing urea in the compound. It may also be of an oxidation-reduction type such as one of the various tetrazolium compounds for example 2,3,5-triphenyl tetrazolium chloride which changes from colorless to intense red in the presence of most microorganisms. The color indicator serves as a means of amplifying the location of microorganism growth colonies in conjunction with use of the test article as a semi-quantitative device. On the other hand, a background dye refers to a dye unaffected by the presence or absence of microorganism growth. The background dye provides a colored background upon which to observe microorganism colony formation which is difficult to observe in the absence of such dye, as in the case of microorganism colonies which are substantially transparent. Various dyes may be used in this capacity such as amaranth red which provides a red background to microorganism growth.

A preferred embodiment comprises the impregnation of the absorbent web with a reagent which includes a suspending agent such as inert gums, carrageens, alginates and various complex polysaccharides and polypeptides. The suspending agent facilitates impregnation and serves to prevent the elution of reagents from the absorbent web, thereby preventing the leaching of such reagents from the web during rehydration of the test article.

As to the process for preparation of the test article, two basic steps are involved; namely, the deposition of the gel layer or layers and the drying of the resultant structure. Impregnations of either the web or the gel layers are preferably accomplished prior to deposition of the gel layer or layers. Deposition of the gel layer or layers may be accomplished by pouring, dipping, rolling or spraying of an aqueous solution of the gel in such a manner so as to form continuous layers, with the initial layer forming a continuous interface as previously described. With respect to the process of preparation of the test article, the terms "layer" and "overlayer" are not restricted to single operations of dipping, pouring, rolling or spraying but rather may be the result of several operations. The distinction between layers is based upon differential composition of the layers resulting from the deposition of different gels or different incorporated reagents or different concentrations of reagents, rather than upon thickness or process of preparation. The resultant structure is then substantially dried by one of a variety of methods possible, such as regulated oven drying, room temperature drying, reduced pressure, and so forth. One method of drying was carried out by exposing the device to ambient temperatures under decreased humidity conditions such as between 5 and 20% relative humidity, for between 10 and 15 hours. A quicker drying method involves oven drying at 50° C. for between ½ and 2 hours. The resulting substantially dry test article is preferably affixed to some means of support such as illustrated in FIGS. 1 and 6. The manner of affixing the laminar structure to the support must be one that is not cidal to microorganisms and does not impair the diffusion or absorption characteristics of the article.

As previously stated herein, the instant invention may include various forms and methods of use in its function in culturing, detecting and analyzing microorganisms. Such forms are illustrated and exemplified by the drawings described herein. Methods of use which are possible through the utilization of the instant invention include "streaking" and "dip-incubate-read" techniques.

When used in conjunction with a "streaking" technique, the test article is dipped in or otherwise contacted with a sterile liquid for a length of time sufficent to substantially rehydrate the gel layer or layers, followed by inoculation through "streaking" of the gel overlayer surface. It is possible to obtain semi-quantitative results by using the method of "streaking" wherein a known volume or amount of the specimen to be tested is "streaked" upon the gel surface. After incubation under standardized conditions, preferably in a sealed container, such as the container 32, to prevent moisture escape, the presence or absence of microorganism growth is readily determined by observation of the gel surface. When used in conjunction with the above-mentioned semi-quantitative "streaking" technique, appropriate comparison of the microorganism growth density on the gel surface to a standard produces a semi-quantitative determination of the extent of infection.

In the utilization of a "dip-incubate-read" technique, the test article is dipped in the liquid specimen to be tested and removed after an appropriate interval of time sufficient to substantially rehydrate the gel layer or layers, the excess liquid being allowed to drain away from the test article. This results in the simultaneous rehydration of the gel layers and inoculation of the test article. The moisture required for microorganism growth is thereby absorbed into the web. Microorganisms, if present in the liquid, are absorbed into the web and deposited on the gel surface. Microorganism growth results therefore within the absorbent web and upon the gel surface; however, the colonies formed within the web are incidental to the main objective of surface growth on the gel. After incubation under standardized conditions in a sealable container to prevent moisture escape, the presence or absence of microorganism growth is readily determined by observation of the gel surface.

In both of the above described methods of use, microorganism growth results on the gel surface, thereby allowing the removal of colonies for further analysis such as gram staining. Also, through the utilization of gels such as agar which are commonly in use in petri dish techniques, it may be possible to make a quick diagnosis of the type of infection through morphological observation of pure colonies. The surface of the agar layer is effectively equivalent to the surface of agar gel in a petri dish technique. These two qualities of surface growth and gel surface afford the microbiologist or diagnostician an extremely effective device for the detection of microorganisms. The instant invention also necessarily possesses the qualities of stability, due to its substantially dehydrated state which extends the useful life of the gel surface and prohibits contamination from the environment; reliability, due to the continuous interface structure which enhances interaction between the absorbent web as a moisture retainer and the gel overlayer as a nutrient and microorganism support; simplicity, due to its compactness; and, low cost relative to prior art devices and systems. The instant invention therefore provides the area of microbiology with an extremely useful test article.

The invention will now be illustrated but is not intended to be limited by the following example:

EXAMPLE

Twenty-six strips of Schleicher and Schuell No. 470 filter paper were cut to a dimension of 3 cm. by 1 cm. and impregnated with an aqueous solution having the following concentrations of suspending agent and nutrients:

Tryptose blood agar base _____ gm./l__ 30
Beef extract _____ gm./l__ 9
Sodium chloride _____ gm./l__ 5
Sodium alginate _____ percent__ 2

Impregnation was accomplished by submersion of the strips in the above solution for 5 minutes followed by passage of the strips through a wringer and subsequent drying at 50° C. for about one hour. An initial layer consisting of an aqueous solution of 5% agar and 0.2% amaranth red background dye was then sprayed to one side of the dry, impregnated paper strips. The resulting initial laminated structures comprising a continuous interface of impregnated paper and agar-dye solution were then dried at 50° C. for about one hour.

Figure 4:
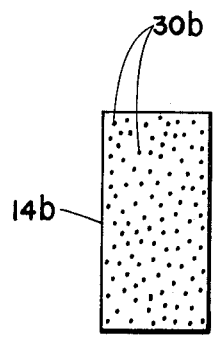
Figure 5:
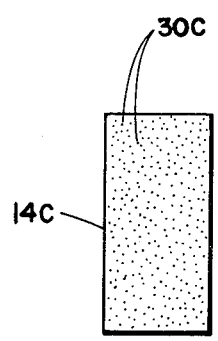

Twenty-five of the strips were divided into five groups of five each. An overlayer consisting of various different gels incorporated with reagents was roller coated to each of the five groups of strips. The composition of the overlayer consisted of an aqueous solution having the following concentrations of ingredients:

Tryptose blood agar base _____ gm./l__ 30
Beef extract _____ gm./l__ 9
Sodium chloride _____ gm./l__ 5
Sodium alginate _____ percent__ 2 and the following concentrations of gel characteristic of a respective group of five strips:

Group 1—5% agar
Group 2—20% gelatin/1.25% agar
Group 3—1% cellulose gum/4% agar
Group 4—1% alginate/4% agar
Group 5—1% fetal calf serum/5% agar The resulting laminated structures were then dried at 50° C. for about one hour. Five of the test devices, one from each of the five groups, were dipped respectively into previously prepared liquid mediums containing $10^2$, $10^3$, $10^4$, $10^5$ and $10^6$ microorganisms per ml. of *Escherichia coli* and removed after 5 to 30 seconds depending on the liquid medium. Excess liquid was allowed to drain away from the test devices. These inoculated test devices were placed in a sterile sealed container, like the container 32 of FIG. 6, and incubated at 37° C. overnight. On all of the inoculated test devices, distinct, transparent, round, raised microorganism colonies were observed against the amaranth red dye background. The density of the observed colonies on the surfaces of the overlayers was found to be a function of the dipping process and standardized incubation in addition to the density of microorganism in the test medium. The resulting surface density provided sufficient uniformity of distribution, separation and size of colonies to allow semi-quantitative determinations between $10^2$ and $10^5$ microorganisms per ml. Such resulting surface densities are illustrated in FIGS. 3, 4 and 5 which show microorganism growths 30a, 30b and 30c representing semi-quantitative distributions of $10^3$, $10^4$ and $10^5$ microorganisms per ml. respectively. The test device overlayer surface allowed removal of the colonies for further analysis as desired.

The remaining strip was provided with an overlayer as in group 1 above and subsequently dried at 50° C. for one hour. Sterile water was then introduced to the paper portion of the test device for rehydration purposes and the surface of the overlayer was streaked with a loop carrying a sample of a broth of *Escherichia coli*. This inoculated test device was subsequently placed in a sterile, sealed container and incubated overnight at 37° C. Distinct, transparent, round, raised microorganism colonies characteristic of *Escherichia coli* grown in agar plates were observed on the overlayer surface. The test device overlayer surface allowed removal of the colonies for further analysis as desired.

What is claimed is:

1. An article of manufacture for use in microbiology comprising an absorbent web; a substantially dry, substantially rehydratable, continuous layer of a gel in laminar relationship therewith, said web and gel layer being joined by a continuous interface integral with the web and gel layer and formed of a composite of the web and gel layer; and a reagent incorporated with a least one of the components of the structure.

2. An article as in claim 1 wherein said gel is selected from the group consisting of gelatin, agar, mixtures of gelatin and agar, and mixtures of gelatin and/or agar with at least one colloidal substance.

3. An article as in claim 2 wherein said colloidal substance is selected from the group consisting of cellulose gums, carrageens, alginates, albumins, polysaccharides and polypeptides.

4. An article as in claim 1 wherein said gel is agar.

5. An article as in claim 1 wherein said gel is a mixture of agar and gelatin.

6. An article as in claim 1 wherein said reagent is incorporated with said absorbent web.

7. An article as in claim 6 wherein said reagent is selected from the group consisting of microbiological nutrients, suspending agents and color indicators.

8. An article as in claim 7 wherein said suspending agents are selected from the group consisting of inert gums, carrageens, alginates, polysaccharides, and polypeptides.

9. An article as in claim 1 wherein said reagent is incorporated with said gel layer.

10. An article as in claim 9 wherein said reagent includes a microbiological nutrient.

11. An article as in claim 9 wherein said reagent includes a color indicator.

12. An article as in claim 1 additionally comprising at least one substantially dry, substantially rehydratable, continuous overlayer of a gel positioned in laminar relationship with said gel layer.

13. An article as in claim 12 wherein said gel is selected from the group consisting of gelatin, agar, mixtures of gelatin and agar, and mixtures of gelatin and/or agar with at least one colloidal substance.

14. An article as in claim 13 wherein said colloidal substance is selected from the group consisting of cellulose gums, carrageens, alginates, albumins, polysaccharides and polypeptides.

15. An article as in claim 12 wherein said gel is agar.

16. An article as in claim 12 wherein said gel is a mixture of agar and gelatin.

17. An article as in claim 12 wherein a reagent is incorporated with said gel overlayer or overlayers.

18. An article as in claim 17 wherein said reagent includes a microbiological nutrient.

19. An article as in claim 17 wherein said reagent includes a color indicator.

20. A process for preparation of a microbiological article which comprises depositing an initial continuous layer of a solution of a gel upon an absorbent web to form a continuous interface integral with the web and initial gel layer and comprising a composite of the web and initial gel layer; incorporating at least a portion of one of the components of the resultant structure with a microbiological nutrient material; subsequently substantially drying the resultant nutrient incorporated structure; depositing at least one additional layer of a solution of a gel upon said initial gel layer to form at least one continuous overlayer; and substantially drying the resultant structure.

21. A process as in claim 20 wherein said gel used to form said initial gel layer and said gel used to form said gel overlayer, which gels may be the same or different, are selected from the group consisting of gelatin, agar, mixtures of gelatin and agar, and mixtures of gelatin and/or agar with at least one colloidal substance.

22. A process as in claim 21 wherein said colloidal substance is selected from the group consisting of cellulose gums, albumins, alginates, carrageens, polysaccharides and polypeptides.

23. A process as in claim 20 wherein said gel used to form said initial gel layer is agar.

24. A process as in claim 20 wherein said gel used to form said initial gel layer is a mixture of agar and gelatin.

25. A process as in claim 20 wherein said gel used to form said gel overlayer is agar.

26. A process as in claim 20 wherein said gel used to form said gel overlayer is a mixture of agar and gelatin.

27. A process as in claim 20 wherein said solution of gel which is deposited to form at least one additional gel overlayer includes a reagent.

28. A process as in claim 27 wherein said reagent includes a microbiological nutrient.

29. A process as in claim 27 wherein said reagent includes a color indicator.

References Cited

UNITED STATES PATENTS

| | | | |
|---|---|---|---|
| 3,337,416 | 8/1967 | Forgacs | 195—103.5 R |
| 3,416,998 | 12/1968 | Streitfeld | 195—103.5 R |

OTHER REFERENCES

Hartman: "Miniaturized Microbiological Methods," Academic Press, 1968, pp. 65–69.

A. LOUIS MONACELL, Primary Examiner

R. B. PENLAND, Assistant Examiner